Nov. 22, 1932.  J. J. TATUM  1,888,942
SLACK ADJUSTER FOR RAILWAY BRAKES
Filed Aug. 15, 1929    4 Sheets-Sheet 4
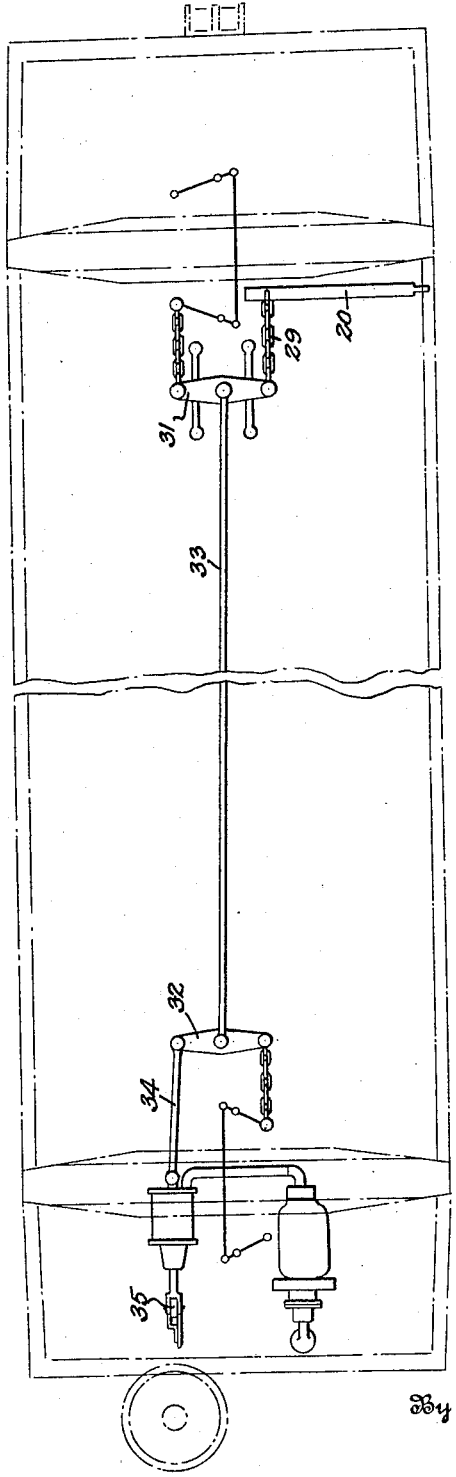
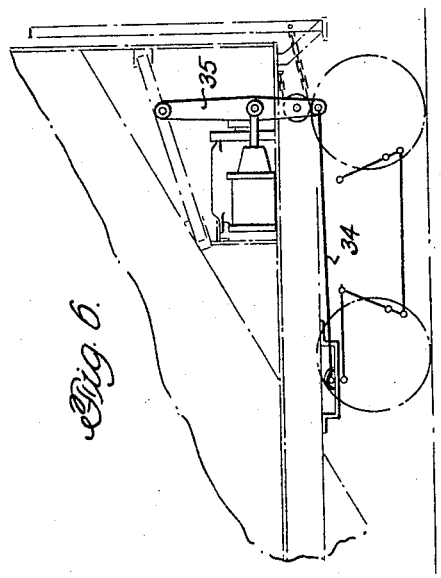
Inventor
John J Tatum
By
Attorney Patented Nov. 22, 1932

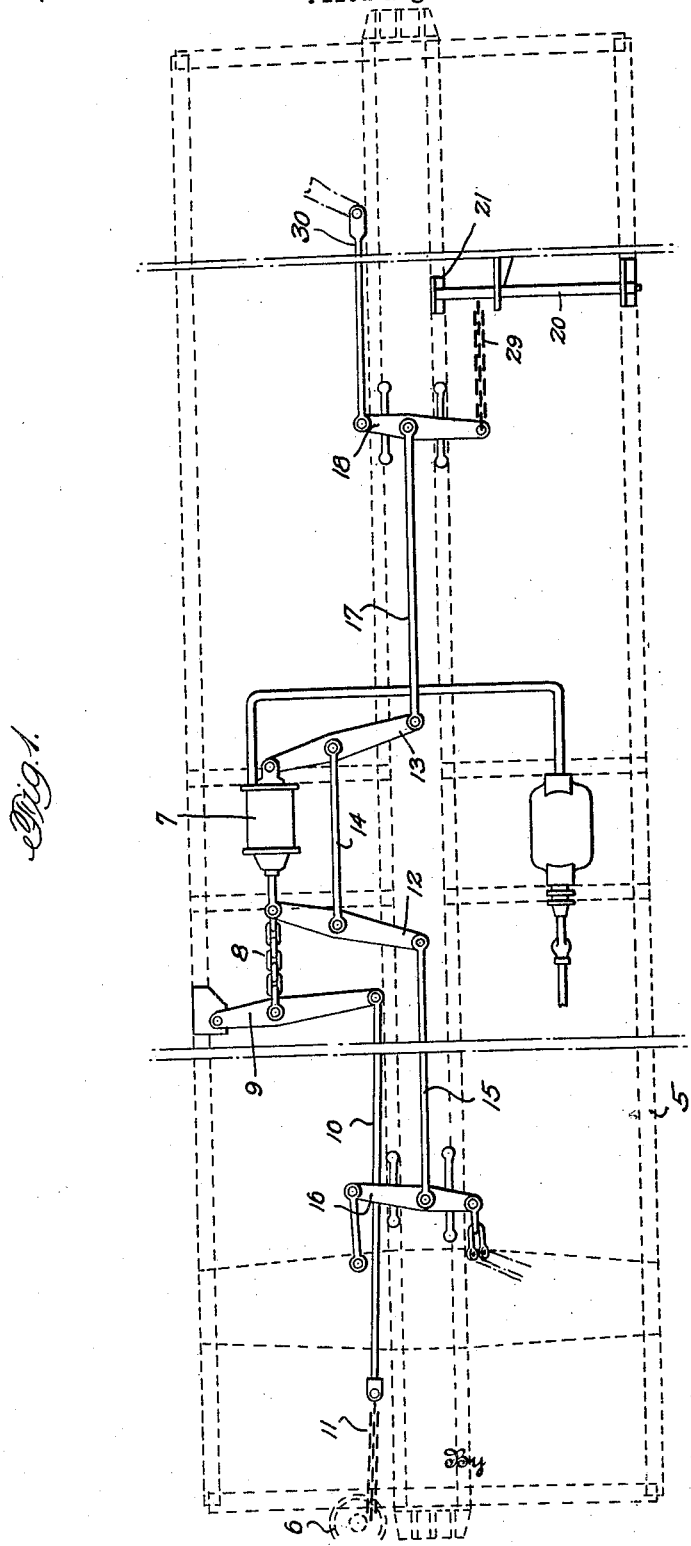

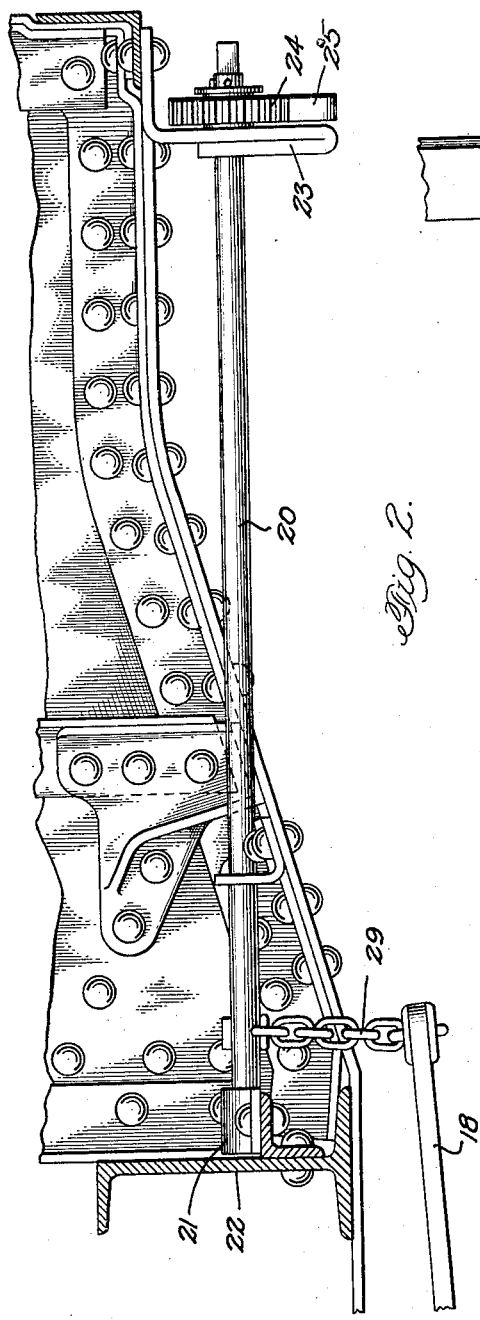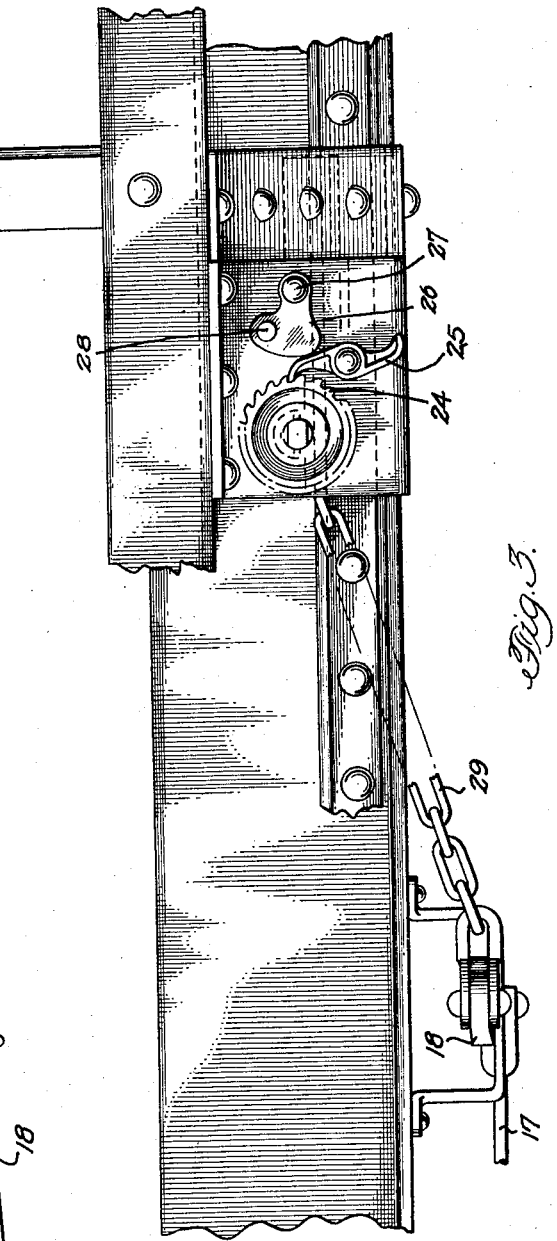

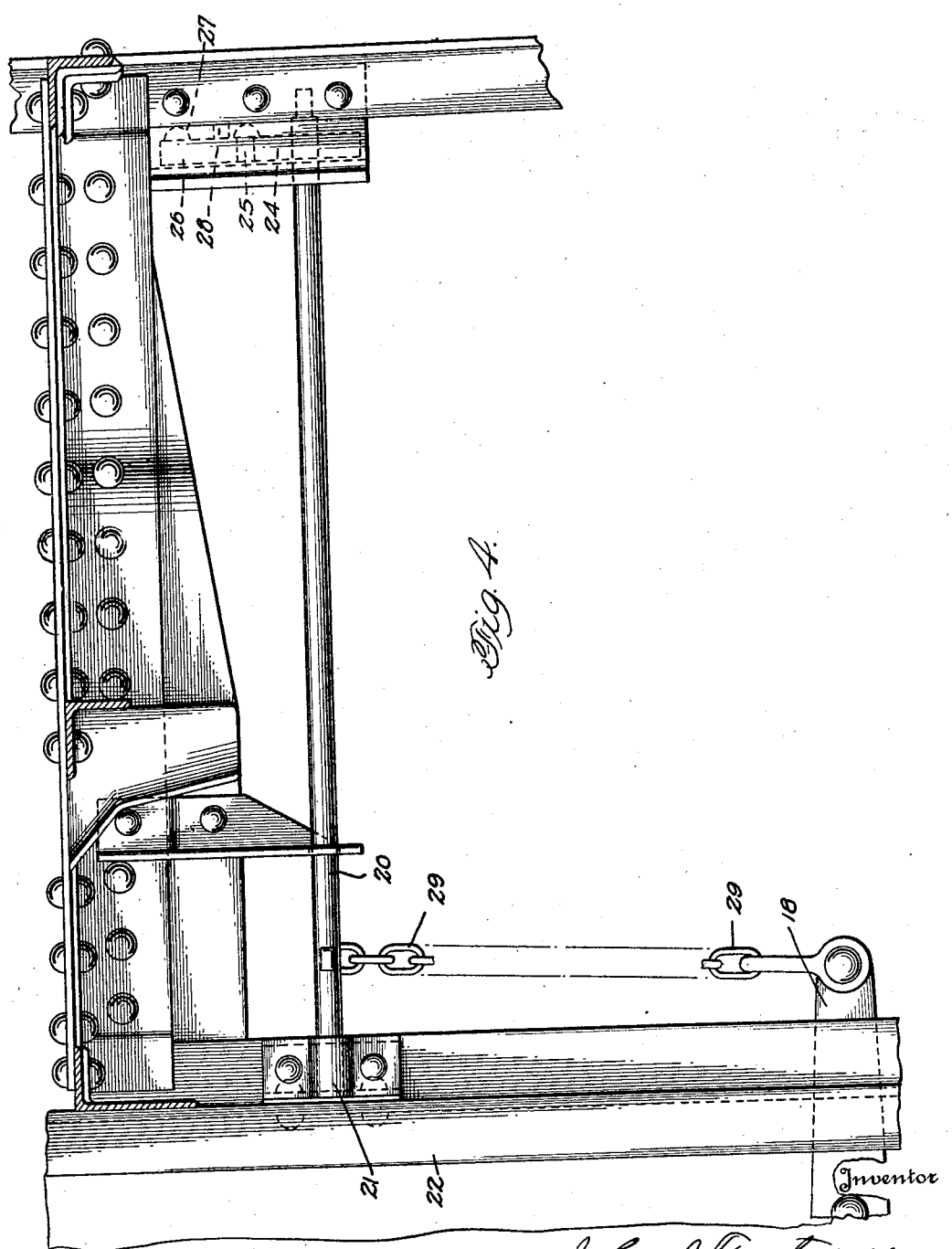

1,888,942

UNITED STATES PATENT OFFICE

JOHN J. TATUM, OF BALTIMORE, MARYLAND

SLACK ADJUSTER FOR RAILWAY BRAKES

Application filed August 15, 1929. Serial No. 386,055.

The object of this invention is to eliminate slack from the brake equipment applied to the car as it accumulates from wear, stretching of rods, and other causes, so as to insure a proper and effective application of brakes, both hand and air, and avoiding excessive piston travel and excessive hand brake rod travel in the application of the hand brake, insuring both the air brake and the hand brake applications being effective, to that extent of controlling the speed of the car when moving in train, or to hold the car from movement when set out of train.

This slack adjuster is applied to what is known as an independent brake arrangement, that is, the air brakes can be applied without affecting the hand brake operation, or the air brake might leak off after it is applied, releasing as it were the effect of holding the brakes on the car, without affecting the hand brake. In other words, should the air brake leak off and the hand brake was applied, and the car would be setting on a grade, the effect of the air brake leaking off would in no way affect the release of the brake on the car if the hand brake was set, as one operates independently of the other.

I do not claim the independent hand brake arrangement, but I do claim an improvement to such an arrangement by providing a slack adjuster that will adjust all the slacks above referred to from the brake rigging, so as to insure an effective hand brake and air brake.

In the drawings:

Figure 1 is a top plan view of a brake rigging embodying my invention on a car, the car being shown in outlines in dotted lines.

Figure 2 is a transverse sectional view of a part of a car with my invention in position thereon.

Figure 3 is a side elevation of Figure 2, looking toward the left.

Figure 4 is a top plan view of Figure 2.

Figure 5 is a view similar to Figure 1 showing a different arrangement of levers.

Figure 6 is a detail side elevation at one end of the car.

The reference numeral 5 designates a car shown in dotted lines on one end of which is mounted the usual hand brake staff and wheel 6.

The air brake cylinder 7 the piston in which is connected with the hand brake staff by the chain 8, lever 9, rod 10 and chain 11 do not independently form part of my invention, nor do the live and rear cylinder levers 12 and 13 connected by the rod 14, nor the rod 15 connecting the lever 12 with the floating lever 16, rod 17, connecting the lever 13 with the floating lever 18 which in turn is connected with the lever on the truck by the rod 19.

My invention resides in a slack adjuster for the brake rigging and includes the horizontally disposed shaft 20, one end of which is journalled in a bearing 21 secured to the center sill 22 of the car. The outer end of the shaft 20 extends to or near the side sill of the car and is journalled in a suitable bearing 23, the outer end of the shaft to be within the clearance line of the car, so as not to encroach upon the American Railway Association clearance in any way, insuring against the restriction of the operation of the car over any, or all railroads in this country.

The outer end of the shaft 20 is rectangular and a ratchet wheel 24 is keyed thereto, there being a pawl 25 suitably mounted on the hanger of the bearing 23, to engage and hold the ratchet wheel 24 in an adjusted position. To hold the pawl 25 in its interlocked relation to the ratchet wheel 24 under all service conditions, I provide a weighted dog 26, which is pivoted at 27, on a suitable support, and adapted to have wedging relation with the pawl thereby holding the pawl against accidental disengagement from the ratchet wheel 24. The dog is provided with a lug 28 which may be struck with a suitable instrument to move it from wedging relation with the pawl to permit of rotation of the ratchet wheel when desired.

One end of the chain, cable, or other flexible element 29 is securely fixed to the shaft 20 near its inner end, while its other end is securely attached to one end of the floating lever 18. The term "flexible connection" used herein is intended to cover a chain, cable, or other element adapted to be wound around the shaft 29 for all, or part of its length.

My slack adjuster is, preferably, applied on that end of the car opposite the end to which the hand brake is applied; that is to say, the hand brake is at one end of the car and my slack adjuster at the other end of the car, and as stated the adjuster is located within the clearance of the car, and can be operated by applying to the outer rectangular end of the shaft 20, a crank, wrench, or other suitable tool without the necessity of the workmen going under the car, or between the ends of the car for the purpose of adjusting the slack in the brake rigging on the car. Also it will be seen that the adjuster is applied to a float lever 18 independent of the brake cylinder levers and which is in the nature of an intermediate lever disposed between a cylinder lever 13 and the truck lever to which said lever 18 is attached, thus obviating the necessity of changing the standard practice arrangement of any of the parts of the brake cylinder rigging and enabling the adjuster to be applied wholly on one side of the longitudinal center of the car.

The adjuster is simple, effective and inexpensive to apply. Its maintenance cost will be practically nil, and its construction ensures compliance with all existing laws and railway regulations.

On revolving the shaft 20 for taking up slack in the rigging, the chain 29 is wound around the shaft 20, thereby pulling on the floating lever 18, and moving it to the desired position, which by reason of its rod and lever connections takes up all slack as it accumulates from wear, stretching of rods, and other causes, and insures a proper and effective application of brakes, both hand and air, and avoids excessive piston travel, and excessive hand brake rod travel in the application of hand brake.

In Figures 1, 2, 3, 4, the flexible connection 29 leads from the shaft 20 to the floating lever 18 of the foundation brake rigging, to which is attached a rod 30 extending from the live lever on the truck and a rod 17 extending from the air brake cylinder lever, while in Figure 5, I show the flexible connection 29 secured to one end of a floating lever 31, which, in turn, is connected directly to the floating lever 32 by the rod 33, one end of the floating lever 32 being connected by a rod 34 to the air brake cylinder lever 35.

What I claim is:

1. In combination, in a slack adjuster for railway brakes, a pair of floating levers of the foundation brake rigging of a car independent of the cylinder levers thereof and located at opposite ends of the car, a shaft rotatably mounted on the car, a chain connecting one of said levers with said shaft, whereby when the shaft is turned to wind up the connecting chain it will draw the two floating levers on both ends of the car toward the rotating shaft.

2. In combination, in a slack adjuster for railway brakes, floating levers of the foundation brake rigging located at opposite ends of the car, a shaft rotatably mounted on the car, and a chain connecting one of said levers with said shaft, said levers being so connected that when the chain is wound on said shaft the floating levers on both ends of the car move toward the same end of the car at which the shaft is located.

3. In combination, in a slack adjuster for railway brakes, a floating air cylinder lever, a dead air cylinder lever, floating levers independent of but coupled to the respective air cylinder levers, a shaft rotatably mounted on the car with one end extending to the side of the car, means controlling the rotation of said shaft, and a chain secured at one end to said shaft and at its other end to an end of one of said floating levers.

4. In combination, in an independently operating foundation brake gear, in which the hand brake and the air brake can be operated independently of each other, live and rear cylinder levers, a floating lever independent of the cylinder levers arranged at the opposite end of the car from the hand brake, one end of which is connected to a truck lever and a cylinder lever, a rotating shaft on the end of the car opposite the hand brake, and means connecting said shaft with the other end of said floating lever whereby the accumulation of slack in the levers, rods and other connections of the foundation brake gear is taken up by rotating said shaft, 5. In combination, in an independently operating foundation brake gear in which the hand and the air power operated brakes operate independently of each other, live and rear cylinder levers, floating levers independent of the cylinder levers located on the ends of the foundation brake gear, one end of each of said levers being connected to an adjacent brake lever on the truck, a rotating shaft at one end of the car, and flexible means connecting said shaft with one end of one of said floating levers, whereby the accumulation of slack in the brake is taken up by rotating said shaft.

6. In a slack adjuster for railway car brakes, a brake rigging including live and rear cylinder levers, a floating lever located between said rear cylinder lever and a truck lever and having one end connected to the rear cylinder lever and to said truck lever, a shaft having an operating end extending to one side of the car, and a flexible winding connection between said shaft and the other end of the floating lever.

7. In a slack adjuster for railway car brakes embodying a foundation brake gear including live and rear cylinder levers in which the hand brake and the air brake can be operated independently of each other, a floating lever independent of said cylinder levers located at the opposite end of the car from the hand brake and between said rear cylinder lever and a truck lever, said lever having one end connected to the rear cylinder lever and to said truck lever, a shaft on the car adjacent to the floating lever and forming an operating end extending to one side of the car, and a flexible winding connection between said shaft and the other end of the floating lever.

8. In combination, in a slack adjuster for railway brakes, and in combination with live and rear cylinder levers, a truck lever, a floating lever for the brake gear receiving motion from one of said cylinder levers, a horizontally disposed rotatable shaft on the car, one end of which extends to the side of the car, a connection between the floating lever and the truck lever, and a chain connecting the said floating lever and shaft and adapted to be wound on said shaft when the shaft is rotated.

9. In a slack adjuster for railway brakes, a rear cylinder lever, a truck brake lever, a floating lever between the rear cylinder lever and the truck brake lever, a rotatable shaft, a connection from said floating lever to the truck brake lever, a connection from said floating lever to the rear cylinder lever, and a flexible winding connection between the said floating lever and the rotatable shaft.

10. In a slack adjuster for railway brakes, and in combination with an air brake cylinder, a brake lever mounted on the truck at each end of the car, coupled live and rear cylinder levers, and an operating connection between the live cylinder lever and truck brake lever at one end of the car, a float lever disposed between and coupled to the rear cylinder lever and the truck lever at the opposite end of the car, a rotatable shaft, and a flexible winding connection between said shaft and said float lever.

11. In a slack adjuster for railway brakes, and in combination with an air brake cylinder, a brake lever mounted on the truck at each end of the car, coupled live and rear cylinder levers, and an operating connection between the live cylinder lever and truck brake lever at one end of the car, a hand brake staff at said end of the car, a connection between the same and the live cylinder lever, a float lever disposed between and coupled to the rear cylinder lever and the truck lever at the opposite end of the car, a rotatable shaft, and a flexible winding connection between said shaft and said float lever.

12. In a slack adjuster for railway brakes, and in combination with an air brake cylinder, a brake lever mounted on the truck at each end of the car, coupled live and rear cylinder levers, and an operating connection between the live cylinder lever and truck brake lever at one end of the car, a float lever disposed between and coupled to the rear cylinder lever and the truck lever at the opposite end of the car, a rotatable shaft located between the longitudinal center and one side of the car on a line between said float lever and the truck lever to which it is connected, and a flexible winding connection between said shaft and said float lever.

13. In a slack adjuster for railway brakes, and in combination with an air brake cylinder, a brake lever mounted on the truck at each end of the car, coupled live and rear cylinder levers, and an operating connection between the live cylinder lever and truck brake lever at one end of the car, a hand brake staff at said end of the car, a connection between the same and the live cylinder lever, a float lever disposed between and coupled to the rear cylinder lever and the truck lever at the opposite end of the car, a rotatable shaft located between the longitudinal center and one side of the car on a line between said float lever and the truck lever to which it is connected, and a flexible winding connection between said shaft and said float lever.

14. In a slack adjuster for railway brakes, the combination with a pair of truck brake levers, of truck brake rigging located at opposite ends of a car, a pair of coupled brake cylinder levers for respectively actuating said truck brake levers, intermediate levers located between the respective truck brake levers and their respective actuating cylinder levers and connected thereto, a winding shaft, and a flexible winding connection between said shaft and an intermediate lever forming an adjustable fulcrum for said lever.

15. In a slack adjuster for railway brakes, the combination with a pair of truck brake levers, of truck brake rigging located at opposite ends of a car, a pair of coupled brake cylinder levers for respectively actuating said truck brake levers, intermediate levers located between the respective truck brake levers and their respective actuating cylinder levers and connected thereto, hand brake operating means at one end of the car coupled to one of the cylinder levers, a winding shaft at the opposite end of the car, and a flexible winding connection between said shaft and the adjacent intermediate lever forming an adjustable fulcrum for said lever.

16. In a slack adjuster for railway brakes, the combination with a pair of truck brake levers, of truck brake riggings located at opposite ends of the car, live and rear brake cylinder levers, intermediate levers located between the respective truck brake levers and the live and rear brake cylinder levers and coupled to said levers, a hand brake operating means at one end of the car coupled to the live cylinder lever, a rotatable shaft at the opposite end of the car, and a flexible winding connection between said shaft and the intermediate lever at the same end of the car and forming an adjustable fulcrum for said lever.

17. In a slack adjuster for railway brakes, the combination with a pair of truck brake levers, of truck brake riggings located at opposite ends of the car, live and rear brake cylinder levers, intermediate levers located between the respective truck brake levers and the live and rear brake cylinder levers and coupled to said levers, an operating device at one end of the car, and a flexible winding connection between said device and the adjacent intermediate lever and forming an adjustable fulcrum for the latter.

18. In a slack adjuster for railway brakes, float levers connected to the foundation brake rigging at each end of the car, each float lever being connected to a truck brake lever at the same end of the car, connecting means between said float levers, a rotating shaft, and a flexible winding connection between the shaft and one of the float levers, said levers being so connected and coupled by said flexible connection to the shaft that both levers are adapted to move simultaneously in the same direction on a winding motion of the shaft and winding connection.

19. In a slack adjuster for railway cars, two truck brake levers mounted respectively on trucks at opposite ends of the car, two coupled brake cylinder levers, two intermediate float levers disposed between the respective truck levers and cylinder levers and each coupled to one of the truck levers and one of the cylinder levers, a shaft arrange transversely of the car on a line between one of the float levers and the truck at the same end of the car, and a flexible connection between said shaft and said float lever.

20. In combination, in a slack adjuster for railway brakes, two truck levers at opposite ends of the car, a shaft rotatably mounted on the car with one end extending to the side of the car, a floating lever forming part of the foundation brake rigging, connections between said floating lever and the truck levers for moving the latter in opposite directions simultaneously, and a flexible connection between the shaft and floating lever, whereby when the shaft is turned to a release position the two truck levers may move simultaneously in opposite directions from each other.

In testimony whereof I affix my signature.

JOHN J. TATUM.